Patented Oct. 19, 1943

2,331,915

UNITED STATES PATENT OFFICE 2,331,915

HYDROGENATION CATALYST

William J. Kirkpatrick, Marshallton, Del., assignor to Hercules Powder Company, Wilmington, Del., a corporation of Delaware No Drawing. Application December 19, 1940, Serial No. 370,797

24 Claims. (Cl. 252—208)

This invention relates to improvements in catalytic hydrogenation, and, more particularly, to new forms of noble metal catalysts and their production.

Heretofore, various materials have been used as support materials for catalysts generally. In particular, supports for hydrogenation catalysts have included such materials as diatomaceous earth, pumice, carbon, etc. With the use of these supports, well-defined improvements resulted. The catalysts had greater activity, could be used for longer periods of time without regeneration, etc. However, it is an established fact that with or without the use of a support many substances have the property of poisoning catalytic surfaces. This is especially true in liquid phase catalytic hydrogenation. In particular, when a rosin solution is in contact with a hydrogenation catalyst supported by the materials above-mentioned, this phenomenon has been noted. It is to be expected that when these so-called "poisons" are formed within the catalyst, the period of time over which the catalyst can be used would be shortened and that a greatly reduced activity would result. This is just exactly what happens.

A disadvantage which is peculiar to many of the supports formerly used rests in the fact that no one has been able to recover the catalyst completely from the support. Actually, considerably quantities of the catalyst remain in the support and defy removal. This is an exceedingly important fact with respect to the use of noble metal hydrogenation catalysts. When such catalysts are used in many, if not all, hydrogenation processes, it is known that lower temperatures and lower pressures, even atmospheric, are operable. The other methods presently used are hazardous to life and more costly from the standpoint of the apparatus required and conditions under which the procedures are carried out. It can readily be appreciated that the fact that there is a substantial catalyst loss when the prior art supports are used is a most important factor in retarding the use of noble metal catalysts today even though they are so desirable from other points of view. Furthermore, due to the intensive and somewhat destructive processes to which recourse must be had to recover substantial quantities of the noble metal from the support, most supports cannot be used again.

It is an object of this invention to produce a highly active supported noble metal hydrogenation catalyst.

A further object is to produce a supported noble metal hydrogenation catalyst of exceedingly long life.

A still further object of this invention is to produce a supported noble metal hydrogenation catalyst which does not accumulate poisons on the catalytic material.

Another object is to produce a supported noble metal hydrogenation catalyst whose support readily given up the noble metal in quantitative amounts by simple treatment.

It is also an object to produce a supported noble metal hydrogenation catalyst which can be used indefinitely by the simple process of remaking the catalyst without separating the noble metal from the support.

Other objects will appear hereinafter.

These objects are accomplished by the deposition of a noble metal oxide on the particle surfaces of a finely divided, granular, inert, substantially non-porous material followed by reduction of the noble metal oxide to the noble metal in the presence of hydrogen. Actually, the noble metal oxide appears to be present essentially as single crystals firmly adhering to the surfaces of the individual granular particles employed as the support when viewed through a petrographic microscope.

It should be understood at this point that by a "substantially non-porous" substance it is meant that the non-porosity refers to the particles individually in contradistinction to the material as a whole. Also by "substantially non-porous" it is meant that the pores, if there be any, of the particles of the material under consideration are small as compared with the particles themselves.

According to my invention, then, an improved supported noble metal hydrogenation catalyst may be prepared by coating the particles of a finely divided, inert, granular substantially non-porous support material with a mixture of a noble metal compound and an alkali metal nitrate and then heating to a temperature within the range of about 450° C. to about 550° C. to effect reaction between the noble metal compound and the nitrate with the resulting formation of the noble metal oxide. Upon reduction with hydrogen, such a catalyst is ready for use as a hydrogenation catalyst.

In greater detail the process of my invention is carried out by adding to an aqueous solution of a noble metal compound, contained in a suitable vessel, a quantity of an alkali metal nitrate. Or, if desired, an aqueous solution of an alikali metal nitrate may be prepared and the noble metal compound added to it. Preferably, the nitrate should be employed in an amount which varies between the stoichiometric equivalent and about a 50% excess thereof. Six mols of sodium nitrate react with one mol of platinum chloride. Hence, the nitrate should be utilized in an amount between 6 and 9 mols for each mol of platinum chloride. The same applies for rhodium chloride. It is important too that the minimum amount of water possible be employed in effecting the solution.

To this solution the non-porous support material is added and the whole taken to dryness with constant stirring. Desirably, the resulting material is ground lightly and mixed thoroughly for the purpose of distributing the noble metal salts evenly throughout the mass. In order to form the noble metal oxide, it is then heated in a suitable furnace at a temperature within the range of from about 450° C. to about 550° C. for a period of from about 30 minutes to about 60 minutes. Preferably, however, I heat the material for about 40 minutes at a temperature within the range of from about 500° C. to about 550° C. The mass is then allowed to cool and the water-soluble impurities extracted by, for example, allowing the material to stand in distilled water for several hours and then filtering and washing with distilled water. The washed catalyst is then dried at temperatures preferably below 110° C. After light crushing it is ready for use.

In preparing a platinum oxide catalyst by the process just described, the aqueous solution of a platinum compound may be conveniently prepared by dissolving metallic platinum in aqua regia, taking the solution to dryness and then dissolving the compound in dilute nitric acid. It will be understood, however, that any other method of obtaining an aqueous solution of a platinum compound is contemplated.

The inert, granular, non-porous support may comprise naturally occurring, finely divided materials such as, true tripoli, or naturally occurring minerals that ordinarily have to be reduced to a finely divided condition by means of grinding, such as, quartz, corundum, zircon, rutile, brookite, anatase, beryl, cristobalite, baddeleyite, thalenite, thorite, bromellite, chrysoberyl, etc.

The inert, granular, non-porous supports may also consist of artificial, finely divided substances of the class of refractory oxides and silicates, such as, fused alumina, fused silica, fused beryllia, fused titania, fused zirconia, fused thoria, fused beryllium silicate, fused aluminum silicate, fused zirconium silicate.

The inert, granular, finely divided support may be produced from finely divided porous material, such as, diatomaceous earth by subjecting it to an alkali flux calcining treatment as described in U. S. Patent 1,502,547 to R. Calvert, K. L. Dern, and G. A. Alles so as to render it substantially non-porous.

While improved results may be obtained in using any finely divided, inert, granular, substantially non-porous material as the support in this invention, preferably, a material composed of particles having an average particle size by number less than about 10 microns in diameter is used. Optimum results are however, obtained with the use of a material having an average particle size by number within the range of from about 0.5 micron to about 5.0 microns in diameter. Furthermore, it is contemplated that the aforesaid particles may be used in the form of aggregates or formed into aggregates as a part of the process of making the catalyst. This step is necessary where the catalyst is used in a continuous hydrogenation process. Support materials having rounded or conchoidal surfaces will be particularly desired.

In general, any noble metal compound which is soluble in water or dilute acid may be used in accordance with the processes of this invention to produce new and improved catalytic agents. By noble metal, however, it is not meant the metals of the currency group but those of the platinum group consisting of iridium, ruthenium, rhodium, platinum, palladium and osmium. It is contemplated, too, that the noble metal be deposited on the particles of the support material in the form of a noble metal oxide or a hydrate thereof, depending upon the temperature at which the catalyst was dried.

There follow several examples which illustrate different ways in which the principle of this invention has been demonstrated, but they are not to be construed as being limiting. All parts and percentages are by weight unless otherwise specified.

*Example 1*

One part by weight of metallic platinum, obtained from ammonium chloroplatinate by ignition at substantially 500° C. was dissolved in aqua regia in a glazed porcelain vessel. The solution was suitably heated and taken substantially to dryness with several additions of concentrated nitric acid. Eight parts of sodium nitrate were added with enough water for solution. Twelve parts of ground, substantially non-porous quartz were added, and the mixture taken to dryness with constant stirring. It was then lightly ground so as to cause thorough mixing without further comminution of the quartz after which it was heated in a slow stream of air at 538° C. for 20 minutes and then allowed to cool to 500° C. over a 30-minute period. The mass was then cooled to room temperature over a 30-minute period and stirred into 500 parts of distilled water and allowed to stand 3 days. It was finally filtered and washed with water. The material was dried at 90–100° C. and again lightly ground to break the lumps which had formed. The catalyst was then ready for use.

*Example 2*

Substantially the same procedure was followed as in Example 1, except that 20.0 parts by weight of ground substantially non-porous, fused zirconium silicate were used in place of 12.0 parts of ground quartz.

*Example 3*

Substantially the same procedure was followed as in Example 1, except that 24.0 parts of finely ground, substantially non-porous rutile were used in place of 12.0 parts of ground quartz.

*Example 4*

Substantially the same procedure was followed as in Example 1, except that 14.4 parts of finely divided, substantially non-porous, crystalline alumina were used in place of 12.0 parts of ground quartz.

*Example 5*

Substantially the same procedure was followed as in Example 1, except that 11.5 parts of substantially non-porous true tripoli were used in place of 12.0 parts of ground quartz.

Example 6

Substantially the same procedure was followed as in Example 1, except that 9.0 parts of alkali calcined kieselguhr were used in place of 12.0 parts of ground quartz. The average particle size by number of the former was 2.3 microns in diameter.

The above catalysts may be used to hydrogenate various unsaturated materials, in accordance with this invention, by batch or continuous process. If the latter is used, the catalyst is placed in a suitable supporting vessel; and the material to be hydrogenated is circulated in liquid or vapor phase past the catalyst in the presence of hydrogen. Desirably, the current of hydrogen will also be caused to flow past the catalyst, and, in such cases, the flow of hydrogen may either be concurrent with, or, where the material is in liquid phase, countercurrent to the flow of material to be hydrogenated. Uniform distribution of the material, if in liquid phase, over the catalyst, may be effected by spraying it, atomized by a current of hydrogen, from a suitable nozzle. Where the material to be hydrogenated is a solid or a liquid of high viscosity, it may be dissolved in an inert solvent. For example, alcohols such as methyl, ethyl, propyl, isopropyl, butyl, etc., alcohol; acids such as glacial acetic, propionic, butyric, etc., acid; ethers such as ethyl, propyl, isopropyl, etc., ether; esters such as ethyl, propyl, isopropyl, etc., acetate; hydrocarbons, etc., may be used. Various mixtures of the foregoing may also be employed.

The hydrogenation will be desirably conducted at a temperature of from about 10° C. to about 60° C., although the use of any particular temperature is in no way essential to the procedure. The particular pressure employed is likewise non-essential, but a pressure of from atmospheric to about 1000 atmospheres may be used. It is contemplated that the various isotopes of hydrogen such as deuterium or tritium may be substituted for all or part of the hydrogen initially used to reduce the catalyst. These isotopes may likewise be substituted for all or part of the hydrogen to be absorbed by the material being hydrogenated.

The following is an example of the manner in which the above catalysts may be used.

Example 7

A portion of the catalyst prepared as in Example 6 equivalent to 0.5 part of platinum was placed in a glass vessel. Fifty parts of refined wood rosin of color grade N were added with 150 parts of glacial acetic acid. The vessel was placed in a Parr shaker apparatus, and the air exhausted from the vessel and replaced with hydrogen 3 times. A hydrogen pressure of 50–60 pounds per square inch was thereafter maintained within the vessel. The shaker was then started and allowed to run for 30 minutes. At the end of this period the rosin, after the solvent had been distilled off, showed a 0.95% hydrogen absorption. This corresponds to a saturation of 71.2% of the theoretical for abietic acid with two double bonds per molecule. The catalyst, which had been filtered from the solution, was then replaced in the vessel with another 50-part portion of rosin of color grade N and 150 parts of glacial acetic acid.

Any material capable of hydrogenation, for example, vegetable oils, unsaturated fatty acids, olefins, aromatic hydrocarbons, derivatives of the latter, etc., may be hydrogenated in accordance with this invention by the use of the catalyst described above. Materials containing the abietyl radical, for example, rosin, abietic acid, esters thereof, such as methyl abietate, ethyl abietate, glycerol abietate, glycol abietate, etc., abietyl alcohol, rosin oil; terpenes, such as, pine oil, alpha-terpineol, alpha-terpinene, dipentene, pinene, polymerized terpenes, etc., may readily be hydrogenated by the above described procedure. In general, any compounds containing a —C=C— double bond may be hydrogenated in accordance with this invention.

The advantages of the catalyst prepared by utilizing the principles of my invention are manifold. Firstly, there is a minimum of catalyst "poisons" developed in hydrogenation processes using the catalyst of this invention as shown by the fact that they give maximum of activity when compared with all the prior art hydrogenation catalysts. They have a decidedly longer life than the catalysts that have heretofore been used. Actual tests have shown the particular improved catalyst comprising platinum oxide to have a life many times longer than that of an unsupported platinum oxide catalyst. In addition, it has been found that the noble metal, which remains on these catalysts after their useful life is over, can be recovered to the extent of nearly 100% by simply treating the catalyst with aqua regia, etc. Furthermore, the process of recovery does not make the support material unsuitable for further use. Hence, it is possible to remake the catalyst of the present invention without actually recovering the noble metal. This may be done by adding a quantity of an alkali metal nitrate to the support coated with the noble metal solution and proceeding according to the process of the invention.

It will be realized that wherever in the claims attached use is made of the term "average particle size," an average by number is thereby contemplated.

It will be understood that the details and examples hereinbefore set forth are illustrative only and that the invention as broadly described and claimed is in no way limited thereby.

What I claim and desire to protect by Letters Patent is:

1. The process of preparing a hydrogenation catalyst which includes the steps of coating the particles of an inert, granular, substantially non-porous refractory support material with an aqueous solution of a noble metal compound and an alkali metal nitrate and heating the coated material at a temperature within the range of from about 450° C. to about 550° C. to form a noble metal oxide.

2. The process of preparing a hydrogenation catalyst which includes the steps of coating the particles of an inert, granular, substantially non-porous refractory support material with an aqueous solution of a noble metal compound and an alkali metal nitrate, heating the coated material at a temperature within the range of from about 450° C. to about 550° C. to form a noble metal oxide, and extracting water-soluble impurities from the coated material.

3. The process of preparing a hydrogenation catalyst which includes the steps of coating the particles of an inert, granular, substantially non-porous refractory support material with an aqueous solution of a soluble platinum compound and an alkali metal nitrate, heating the coated material at a temperature of from about 450° C. to about 550° C. to form platinum oxide, and extracting water-soluble impurities from the coated material.

4. A process of preparing a hydrogenation catalyst which includes the steps of coating the particles of an inert, granular, substantially non-porous refractory support material with an aqueous solution of a soluble rhodium compound and an alkali metal nitrate, heating the coated material at a temperature of from about 450° C. to about 550° C. to form rhodium oxide, and extracting water-soluble impurities from the coated material.

5. The process of preparing a hydrogenation catalyst which includes the steps of coating the particles of an inert, granular, substantially non-porous refractory support material, having an average particle size of less than 10 microns in diameter, with an aqueous solution of a noble metal compound and an alkali metal nitrate, heating the coated material at a temperature within the range of from about 450° C. to about 550° C. to form a noble metal oxide, and extracting water-soluble impurities from the coated material.

6. The process of preparing a hydrogenation catalyst which includes the steps of coating the particles of an inert, granular, substantially non-porous refractory support material, having an average particle size within the range of from about 5 to about 0.5 microns in diameter, with an aqueous solution of a noble metal compound and an alkali metal nitrate, heating the coated material at a temperature within the range of from about 450° C. to about 550° C. to form a noble metal oxide, and extracting water-soluble impurities from the coated material.

7. The process of preparing a hydrogenation catalyst which includes the steps of coating the particles of substantially non-porous kieselguhr with an aqueous solution of platinum chloride and an alkali metal nitrate, heating the coated material at a temperature within the range of from about 450° C. to about 550° C. to form platinum oxide, and extracting water-soluble impurities from the coated material.

8. The process of preparing a hydrogenation catalyst which includes the steps of coating the particles of substantially non-porous quartz with an aqueous solution of platinum chloride and an alkali metal nitrate, heating the coated material at a temperature within the range of from about 450° C. to about 550° C. to form platinum oxide, and extracting water-soluble impurities from the coated material.

9. The process of preparing a hydrogenation catalyst which includes the steps of coating the particles of substantially non-porous kieselguhr with an aqueous solution of rhodium chloride and an alkali metal nitrate, heating the coated material at a temperature within the range of from about 450° C. to about 550° C. to form rhodium oxide, and extracting water-soluble impurities from the coated material.

10. The process of preparing a hydrogenation catalyst which includes the steps of coating the particles of substantially non-porous kieselguhr, having an average particle size within the range of from about 5.0 to about 0.5 microns in diameter, with an aqueous solution of platinum chloride and an alkali metal nitrate, heating the coated material at a temperature within the range of from about 500° C. to about 550° C. to form platinum oxide, and extracting the water-soluble impurities from the coated material.

11. The process of preparing a hydrogenation catalyst which includes the steps of coating the particles of substantially non-porous quartz, having an average particle size within the range of from about 5.0 to about 0.5 microns in diameter, with an aqueous solution of platinum chloride and an alkali metal nitrate, heating the coated material at a temperature within the range of from about 500° C. to about 550° C. to form platinum oxide, and extracting the water-soluble impurities from the coated material.

12. The process of preparing a hydrogenation catalyst which includes the steps of coating the particles of substantially non-porous kieselguhr, having an average particle size within the range of from about 5.0 to about 0.5 microns in diameter, with an aqueous solution of rhodium chloride and an alkali metal nitrate, heating the coated material at a temperature within the range of from about 500° C. to about 550° C. to form rhodium oxide, and extracting the water-soluble impurities from the coated material.

13. A hydrogenation catalyst comprising an inert, granular, substantially non-porous refractory support material, the particles of which are uniformly coated with an adherent deposit of noble metal oxide, formed on the support material by the reaction of a noble metal compound and an alkali metal nitrate, at a temperature within the range of from about 450° C. to about 550° C.

14. A hydrogenation catalyst comprising an inert, granular, substantially non-porous refractory support material, the particles of which are uniformly coated with an adherent deposit of noble metal oxide, formed on the support material by the reaction of a noble metal compound and an alkali metal nitrate at a temperature within the range of from about 450° C. to about 550° C.

15. A hydrogenation catalyst comprising an inert, granular, substantially non-porous refractory support material, having an average particle size of less than 10 microns in diameter, the particles of which are uniformly coated with an adherent deposit of noble metal oxide, formed on the support material by the reaction of a noble metal compound and an alkali metal nitrate at a temperature within the range of from about 450° C. to about 550° C.

16. A hydrogenation catalyst comprising substantially non-porous kieselguhr, the particles of which are uniformly coated with an adherent deposit of platinum oxide, formed on the kieselguhr by the reaction of platinum chloride and an alkali metal nitrate at a temperature within the range of from about 450° C. to about 550° C.

17. A hydrogenation catalyst comprising substantially non-porous quartz, the particles of which are uniformly coated with an adherent deposit of platinum oxide, formed on the quartz by the reaction of platinum chloride and an alkali metal nitrate at a temperature within the range of from about 450° C. to about 550° C.

18. A hydrogenation catalyst comprising substantially non-porous kieselguhr, the particles of which are uniformly coated with an adherent deposit of rhodium oxide, formed on the kieselguhr by the reaction of rhodium chloride and an alkali metal nitrate at a temperature within the range of from about 450° C. to about 550° C.

19. A hydrogenation catalyst comprising substantially non-porous kieselguhr, having an average particle size within the range of from about 5.0 to about 0.5 microns in diameter, the particles of which are uniformly coated with an adherent deposit of platinum oxide, formed on said kieselguhr by the reaction of platinum chloride and an alkali metal nitrate at a temperature within the range of from about 500° C. to about 550° C.

20. A hydrogenation catalyst comprising substantially non-porous quartz, having an average particle size within the range of from about 5.0 to about 0.5 microns in diameter, the particles of which are uniformly coated with an adherent deposit of platinum oxide, formed on said quartz by the reaction of platinum chloride and an alkali metal nitrate at a temperature within the range of from about 500° C. to about 550° C.

21. A hydrogenation catalyst comprising substantially non-porous kieselguhr, having an average particle size within the range of from about 5.0 to about 0.5 microns in diameter, the particles of which are uniformly coated with an adherent deposit of rhodium oxide, formed on said kieselguhr by the reaction of rhodium chloride and an alkali metal nitrate at a temperature within the range of from about 500° C. to about 550° C.

22. The method of hydrogenating an unsaturated organic compound having at least one —C=C— double bond which includes passing the material in the presence of hydrogen past a hydrogenation catalyst substantially the same as that of claim 13.

23. The process of preparing a hydrogenation catalyst which includes the steps of coating the particles of an inert, granular, substantially non-porous refractory support material, the particles of which have rounded surfaces and an average particle size of less than 10 microns in diameter, with an aqueous solution of a noble metal compound and an alkali metal nitrate, heating the coated material at a temperature within the range of from about 450° C. to about 550° C. to form a noble metal oxide, and extracting water-soluble impurities from the coated material.

24. A hydrogenation catalyst comprising an inert, granular, substantially non-porous refractory support material, the particles of which have rounded surfaces and an average particle size of less than 10 microns in diameter and are uniformly coated with an adherent deposit of noble metal oxide, formed on the support material by the reaction of a noble metal compound and an alkali metal nitrate at a temperature within the range of from about 450° C. to about 550° C.

WILLIAM J. KIRKPATRICK.